US012709262B2

(12) United States Patent
Jennings et al.

(10) Patent No.: US 12,709,262 B2
(45) Date of Patent: Aug. 18, 2026

(54) BRAKE-TO-STEER LATERAL STABILITY MANAGEMENT BASED ON STABILITY INDICATOR CORRELATION

(71) Applicants: Steering Solutions IP Holding Corporation, Auburn Hills, MI (US); Continental Automotive Systems, Inc., Auburn Hills, MI (US)

(72) Inventors: Alexander Jennings, Bath, MI (US); Sarin Kodappully, Midland, MI (US)

(73) Assignees: Steering Solutions IP Holding Corporation, Auburn Hills, MI (US); Continental Automotive Systems Inc., Auburn Hills, MI (US)

( * ) Notice: Subject to any disclaimer, the term of this patent is extended or adjusted under 35 U.S.C. 154(b) by 103 days.

(21) Appl. No.: 18/365,057

(22) Filed: Aug. 3, 2023

(65) Prior Publication Data

US 2025/0042404 A1 Feb. 6, 2025

(51) Int. Cl.
*B60W 30/02* (2012.01)
*B60W 10/04* (2006.01)
(Continued)

(52) U.S. Cl.
CPC ............ *B60W 30/02* (2013.01); *B60W 10/04* (2013.01); *B60W 10/18* (2013.01); *B60W 10/20* (2013.01); *B60W 30/045* (2013.01); *B60W 30/18145* (2013.01); *B60W 2520/10* (2013.01); *B60W 2520/14* (2013.01); *B60W 2520/26* (2013.01); *B60W 2520/28* (2013.01); *B60W 2540/18* (2013.01); *B60W 2710/06* (2013.01);
(Continued)

(58) Field of Classification Search
None
See application file for complete search history.

(56) References Cited

U.S. PATENT DOCUMENTS 6,112,147 A * 8/2000 Ghoneim .............. B60T 8/1755 701/72
6,205,391 B1 * 3/2001 Ghoneim .............. B60T 8/1755 701/79
(Continued)

FOREIGN PATENT DOCUMENTS

CA 2203326 A1 * 10/1997 ........... B60G 17/019
CN 107650893 A 2/2018
(Continued)

OTHER PUBLICATIONS

US Office action dated Feb. 26, 2025 for U.S. Appl. No. 18/365,042.
(Continued)

*Primary Examiner* — Kevin R Steckbauer
(74) *Attorney, Agent, or Firm* — Ingrassia Fisher & Lorenz, LLP

(57) ABSTRACT

A number of variations are disclosed including a system and method for modifying, in real-time, at least one brake or powertrain application to individual roadwheels of a vehicle to increase lateral maneuver capability in a vehicle having an operational, partially operational, failing, or failed electronic steering system. The system and method may include modifying at least one brake or powertrain command to individual roadwheels where vehicle instability is detected.

17 Claims, 5 Drawing Sheets

(51) Int. Cl.

| | |
|---|---|
| ***B60W 10/18*** | (2012.01) |
| ***B60W 10/20*** | (2006.01) |
| ***B60W 30/045*** | (2012.01) |
| ***B60W 30/18*** | (2012.01) |

(52) U.S. Cl.

CPC ..... *B60W 2710/08* (2013.01); *B60W 2710/18* (2013.01); *B60W 2710/20* (2013.01)

(56) References Cited

U.S. PATENT DOCUMENTS

| | | | | |
|---|---|---|---|---|
| 7,848,866 | B2 * | 12/2010 | Nimmo | B60T 8/246 303/189 |
| 8,682,560 | B2 * | 3/2014 | Meyers | B60W 30/045 303/155 |
| 9,008,876 | B2 * | 4/2015 | Pinto | B60L 50/00 180/312 |
| 9,409,554 | B2 * | 8/2016 | Raste | B60T 7/12 |
| 9,469,214 | B2 * | 10/2016 | Wright | B60W 30/18172 |
| 10,046,743 | B2 * | 8/2018 | Jonasson | B62D 9/005 |
| 10,046,749 | B2 * | 8/2018 | Irwan | B60T 13/745 |
| 10,589,738 | B1 * | 3/2020 | Boecker | B60W 30/02 |
| 11,654,891 | B2 * | 5/2023 | Boecker | B60W 10/18 701/41 |
| 11,794,590 | B2 * | 10/2023 | Hwang | B60L 15/2036 |
| 12,195,082 | B2 * | 1/2025 | Schumann | B62D 15/025 |
| 12,397,776 | B2 * | 8/2025 | Plaehn | B60W 10/04 |
| 2003/0045978 | A1 * | 3/2003 | Chandy | B60T 8/1755 701/42 |
| 2007/0021875 | A1 * | 1/2007 | Naik | B60W 30/045 701/72 |
| 2008/0086248 | A1 * | 4/2008 | Lu | B60W 40/101 701/41 |
| 2008/0086251 | A1 * | 4/2008 | Lu | B60T 8/1755 701/70 |
| 2012/0185142 | A1 * | 7/2012 | Meyers | B60T 8/1755 701/70 |
| 2013/0144476 | A1 * | 6/2013 | Pinto | B60L 50/00 903/930 |
| 2014/0207320 | A1 * | 7/2014 | Wright | B60L 15/20 701/22 |
| 2014/0222272 | A1 * | 8/2014 | Raste | B60K 31/0008 701/22 |
| 2015/0019101 | A1 * | 1/2015 | Bajorat | B60T 8/885 701/71 |
| 2020/0180605 | A1 * | 6/2020 | Boecker | B60W 10/20 |
| 2022/0080838 | A1 * | 3/2022 | Hwang | B60L 15/2036 |
| 2022/0111895 | A1 * | 4/2022 | Schumann | B60W 40/114 |
| 2023/0058353 | A1 * | 2/2023 | LaBarbera | B62D 5/006 |
| 2023/0119160 | A1 * | 4/2023 | Labarbera | B60T 8/92 701/70 |
| 2023/0119249 | A1 * | 4/2023 | LaBarbera | B60W 10/04 477/107 |
| 2023/0121296 | A1 * | 4/2023 | Labarbera | B62D 9/005 477/203 |
| 2023/0124821 | A1 * | 4/2023 | Labarbera | B60T 8/1755 701/41 |
| 2023/0322207 | A1 * | 10/2023 | Plaehn | B60W 10/04 701/26 |
| 2025/0042372 | A1 * | 2/2025 | Jennings | B60T 8/17551 |
| 2025/0042390 | A1 * | 2/2025 | Jennings | B60W 30/02 |
| 2025/0042391 | A1 * | 2/2025 | Jennings | B60W 30/02 |
| 2025/0042404 | A1 * | 2/2025 | Jennings | B60W 10/20 |
| 2025/0074422 | A1 * | 3/2025 | Wilhelmsson | F02D 41/12 |

FOREIGN PATENT DOCUMENTS

| | | | | | |
|---|---|---|---|---|---|
| CN | 207535885 | U | | 6/2018 | |
| CN | 109080643 | B | * | 1/2022 | B60W 10/184 |
| CN | 119428629 | A | * | 2/2025 | B60W 10/20 |
| DE | 102012212616 | A1 | | 1/2013 | |
| DE | 102020121733 | A1 | * | 2/2022 | B60W 30/02 |
| DE | 102023132677 | A1 | * | 2/2025 | B60W 10/20 |
| EP | 2623386 | A1 | * | 8/2013 | B60T 8/1755 |
| EP | 2623386 | B1 | * | 9/2020 | B60T 8/1755 |
| JP | 2013067382 | A | * | 4/2013 | |
| JP | 5193885 | B2 | * | 5/2013 | |
| JP | 5970322 | B2 | * | 8/2016 | B60T 8/1755 |
| JP | 5993843 | B2 | * | 9/2016 | |
| JP | 2016182959 | A | * | 10/2016 | |
| JP | 2018030582 | A | * | 3/2018 | |
| JP | 2019142491 | A | * | 8/2019 | |
| KR | 20220034976 | A | * | 3/2022 | B60W 40/101 |
| WO | 2007044744 | A2 | | 4/2007 | |
| WO | WO-2011040115 | A1 | * | 4/2011 | B60W 30/18145 |
| WO | 2015124420 | A2 | | 8/2015 | |
| WO | 2020203055 | A1 | | 10/2020 | |
| WO | 2020203058 | A1 | | 10/2020 | |
| WO | 2022228653 | A1 | | 11/2022 | |

OTHER PUBLICATIONS

US Office action dated Feb. 28, 2025 for U.S. Appl. No. 18/365,073.

Michael S. Wyciechowski et al.; Model Predictive Brake-to-Steer Control for Automated Vehicles; Filed on Sep. 7, 2022 and assigned U.S. Appl. No. 63/404,218.

Michael S. Wyciechowski et al.; Brake-to-Steer for Steer-by-Wire Control Algorithm Using Support From Tertiary Steering Actuation; Filed on Aug. 3, 2023 and assigned U.S. Appl. No. 18/363,982.

Alexander Jennings et al.; Brake-to-Steer Lateral Stability Management Based on Stability Indicator Correlation ; Filed on Aug. 3, 2023 and assigned U.S. Appl. No. 18/365,042.

Alexander Jennings et al.; Brake-to-Steer Lateral Stability Management Based on Stability Indicator Correlation ; Filed on Aug. 3, 2023 and assigned U.S. Appl. No. 18/365,064.

Alexander Jennings et al.; Brake-to-Steer Lateral Stability Management Based on Stability Indicator Correlation ; Filed on Aug. 3, 2023 and assigned U.S. Appl. No. 18/365,073.

US Office action dated Mar. 11, 2025 for U.S. Appl. No. 18/365,064.

DE Office action dated Apr. 2, 2024 for DE application No. 10 2023 132 679.1.

DE Office action dated Apr. 2, 2024 for DE application No. 10 2023 132 678.3.

DE Office action dated Apr. 2, 2024 for DE application No. 10 2023 132 677.5.

DE Office action dated Apr. 2, 2024 for DE application No. 10 2023 132 680.5.

US Office action dated Jun. 5, 2025 for U.S. Appl. No. 18/365,073.

US Final office action dated Sep. 23, 2025 for U.S. Appl. No. 18/365,064.

US Notice of Allowance dated Oct. 2, 2025 for U.S. Appl. No. 18/365,073.

* cited by examiner

BRAKE-TO-STEER LATERAL STABILITY MANAGEMENT BASED ON STABILITY INDICATOR CORRELATION

TECHNICAL FIELD

The field to which the disclosure generally relates to steering, braking, and powertrain systems.

BACKGROUND

Vehicles may include steering systems, including electric power steering systems and steer-by-wire systems.

SUMMARY OF ILLUSTRATIVE VARIATIONS

A number of variations may include a method that may include modifying, in real-time, at least one brake or powertrain application to one or more roadwheels of a vehicle to increase lateral stability during Brake-to-Steer functionality.

A number of variations may include a method that may include increasing, reducing, or scaling at least one of electronic braking system brake commands or powertrain system commands while Brake-to-Steer is active. This may prevent vehicle instability or unintended vehicle oversteer.

Vehicle instability may lead to total loss of vehicle control or create a safety hazard. A number of variations may include a method that may reduce the potential for loss of vehicle control by modifying at least one of Brake-to-Steer brake or powertrain commands based on a number of calculated, measured, or observed stability indicators. This not only improves vehicle safety, but also improves overall vehicle controllability with Brake-to-Steer functionality.

Other illustrative variations within the scope of the invention will become apparent from the detailed description provided hereinafter. It should be understood that the detailed description and specific examples, while disclosing variations of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

Figure 1:
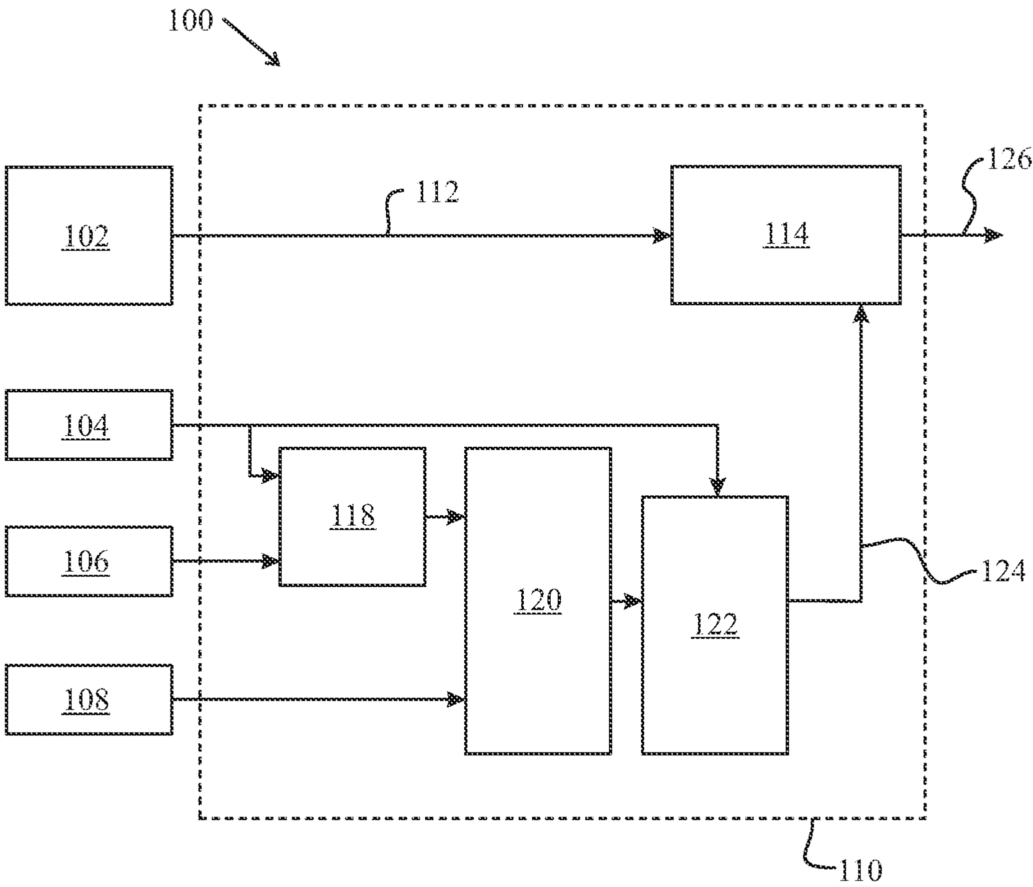
FIG. 1 depicts an illustrative variation of a block diagram of a system and method of Brake-to-Steer lateral stability management.

The drawings are not necessarily to scale, and certain features and certain views of the drawings may be shown exaggerated in scale or in schematic in the interest of clarity and conciseness and should not be considered limiting.

DETAILED DESCRIPTION OF ILLUSTRATIVE VARIATIONS

The following description of the variations is merely illustrative in nature and is in no way intended to limit the scope of the invention, its application, or uses.

Vehicles typically include steering systems, braking systems, and powertrain systems. A steering system may be a connected steering system (a steering system with a mechanical connection between the handwheel and the rack) with power steering, or a steer-by-wire system (a steering system without a mechanical connection between the handwheel and the rack). A braking system may include various means to resist the motion of a vehicle, including frictional and electrical brakes. A powertrain system may include various means for propulsion, such as an internal combustion engine or electric motor, and various means for delivering torques, forces, or pressures from the propulsion system to individual tires, including transmissions, differentials and torque vectoring differentials. A command sent to a braking or powertrain system may include commanded torque, force, throttle or pedal position, current, voltage, pressure, or a similar command not previously stated. A load may include torques, forces, pressures, or a similar unit not previously stated. A steering, braking, or powertrain system may contain electronics, which allow them to send or receive signals and commands, and convert received commands into loads within or generated by the system, and ultimately loads at the tires. A driver of a vehicle controls the motion of a vehicle, and may include a human driver or an automated driver. A system, such as a steering system, may fail, which may include full or partial failure or degradation.

In a wide range of maneuvers, a vehicle driver normally steers the handwheel, and an electric power steering assist motor provides assist to help the driver easily control the vehicle. However, an electric power steering assist system component such as, but not limited to, a power pack or electric motor or actuator may fail. In such a case, the driver can reach very high handwheel torques after applying a steering maneuver and the driver may not be able to steer the vehicle sufficiently due to the high handwheel torque required for steering inputs. This can increase the risk of a vehicle accident. At least one braking or powertrain application to individual wheels may be utilized to provide a unique, diverse support method using a different actuator that can help add lateral capability by adding yaw torque from at least one of braking or powertrain forces. This approach may be used for operational or semi-operational electric power steering or steer-by-wire systems that have been reduced or degraded, to aid a driver or automated controller in a wide range of maneuvers. This may provide or enhance vehicle lateral control capability and supplement the electric power steering system or steer-by-wire system when the driver or automated controller attempts to perform a lateral maneuver to turn or avoid an obstacle.

When an electronic power steering assist system or steer-by-wire system includes a component such as, but not limited to, a powerpack, electric motor, or actuator that has failed, faulted, or degraded, a Brake-to-Steer algorithm may be executed by an electronic processor and result in the production of at least one brake or powertrain command to one or more wheels as a function of vehicle state information. Alternatively, regenerative braking in individual wheels may be used to deploy Brake-to-Steer functionality. Brake-to-Steer may be a software function that provides at least one brake or powertrain command to one or more roadwheels, which may be used in at least one brake or powertrain actuation system, based on driver intent information such as driver handwheel torque or angle. The vehicle state information may include, for example, at least one of lateral acceleration, yaw rate, or if available, steering sensor measurements which may include, for example, at least one of handwheel torque or angle. According to some variations, a Brake-to-Steer system may be controlled by a domain controller constructed and arranged to employ Brake-to-Steer functionality when a lateral maneuver is underway.

Brake-to-Steer may take driver intent inputs and output specific brake commands to individual tires that can be used to help the driver turn the vehicle being operated by the driver. Brake-to-Steer brake commands may be calculated in such a way as to provide enough braking force on at least one roadwheel to generate a yaw torque, which in turn generates a lateral force that supplements the lateral force induced by the driver's manual steering, in a vehicle with a connected steering system with power steering. In a steer-by-wire system, if the rack system is degraded, the driver may lose all lateral control of the vehicle. Brake-to-steer brake commands may be calculated in such a way as to provide enough braking force on at least one roadwheel to generate a yaw torque, which in turn generates a lateral force that enables the driver limited lateral control of the vehicle, initiated by the driver's steering. In a system that is being controlled by an automated driver, if there is a steering fault that degrades the electronic steering system's capability to laterally maneuver a vehicle, the automated driver (autonomous or semi-autonomous driving system) may apply Brake-to-Steer to generate a yaw torque, which in turn generates a lateral force that supplements the lateral force requested by the automated driver. Brake-to-Steer may also apply powertrain commands in response to driver or automated driver inputs to help the vehicle maintain the intended longitudinal speed, and to generate more yaw moments on the vehicle to improve Brake-to-Steer's lateral capability enhancements. Brake-to-Steer may allow the vehicle to achieve higher yaw rates during a wide range of maneuvers than it would have achieved with a degraded steering system without Brake-to-Steer. Brake-to-steer can help improve yaw rates, reduce driver efforts, and improve vehicle lateral control. This can happen for a range of speeds and maneuvers. For example, when maneuvering at low speeds in parking lots, Brake-to-Steer may provide significant effort reduction for the driver.

In some driving scenarios, Brake-to-Steer may cause unintended vehicle oversteer or excessive vehicle yaw rate. An example of when this scenario may occur would be when the driver exceeds the surface friction limit while turning. Existing systems and methods developed to mitigate vehicle stability issues may not function effectively during Brake-to-Steer operation, for a variety of reasons.

Electronic stability control systems typically require a steering wheel angle signal to function, which is important because in the use case of some Brake-to-Steer implementations, the steering wheel angle signal may be unavailable, meaning that Brake-to-Steer may not be able to rely on existing vehicle stability control systems to maintain stability. If the handwheel angle information is available, existing vehicle stability control systems may be insufficient in preventing Brake-to-Steer from causing the vehicle to oversteer, because they do not alter at least one of Brake-to-Steer brake or powertrain commands. An advantage of some variations of the disclosed system and method is ensuring stability for scenarios involving Brake-to-Steer and loss of electronic power steering systems, because some variations of the disclosed system and method can rely on several stability indicators, without the necessity of using handwheel angle. However, if handwheel or steering angle data is available it may be used.

Electronic brake force distribution lacks the capacity to control powertrain torque commands and is only effective when considering negative tire slip. An advantage of some embodiments of the disclosed system and method, stability indicator-based Brake-to-Steer regulation, and in particular, wheel speed-based Brake-to-Steer regulation, is more robust instability detection when powertrain torque is being applied, given it has the capacity to control powertrain torque commands. Additionally, an advantage of some embodiments of the disclosed system is that the disclosed system can act on positive and negative tire slips, in addition to several other stability indicators.

Anti-lock braking systems (ABS) fail to monitor or account for wheel speeds and wheel slip ratios of all the corners of the vehicle as they modulate primarily based on the wheel slip of one tire, not based on the wheel slips relative to different tires. ABS also lacks the ability to control powertrain torque commands. Brake-to-Steer with stability indicator scaling may act on positive and negative tire slips. An advantage of some variations of the disclosed system and method, such as stability indicator-based Brake-to-Steer regulation, is more robust instability detection when at least one brake or powertrain command is being applied to individual wheels, because it can consider positive and negative tire slips and several other stability indicators. Additionally, stability indicator-based Brake-to-Steer regulation has the capability to control powertrain torque commands unlike typical ABS functions.

Traction control systems lack the ability to control Brake-to-Steer brake commands. Traction control systems also lack the ability to act on negative tire slips. An advantage of some embodiments of the disclosed system and method, stability indicator-based Brake-to-Steer regulation may monitor wheel speeds or slip ratios of all the corners of the vehicle and their relationships with each other, in addition to other stability indicators. Therefore, the Brake-to-Steer Stability method, system, or computer product which may include an algorithm, which are described herein are more robust at detecting instabilities when at least one braking or powertrain command are being applied to individual wheels.

Stability indicator-based Brake-to-Steer regulation may continuously monitor vehicle stability in all driving conditions and prevent the vehicle from losing stability in situations where Brake-to-Steer application causes the vehicle to oversteer. The system and method may be tuned to act when vehicle oversteer characteristics are detected based on individual or a plurality of stability indicators.

Stability indicators may include a number of stability detection metrics such as, but not limited to, yaw rate error, differential wheel slip, outputs from electronic power steering (EPS), electronic stability control (ESC), traction control systems (TCS), or anti-lock braking systems (ABS), or measured or observed road surface friction (mu) indicators. A number of variations may include a method, system or computer medium with executable instructions to scale, reduce, or increase at least one Brake-to-Steer brake or Brake-to-Steer powertrain command in an event where the Brake-to-Steer commands are causing vehicle instability or unintended vehicle oversteer, especially in low surface mu driving scenarios but not limited thereto.

A number of variations may include a Brake-to-Steer stability method, system, or a computer product which may include a medium with instructions executable by an electronic processor for modifying, in real-time, at least one brake or powertrain application to individual roadwheels of a vehicle to increase lateral stability during Brake-to-Steer functionality. A number of variations may include a computer product, which may include instructions such as an algorithm stored on medium and executable by an electronic processor, to carry out a variety of functions described herein. A Brake-to-Steer Stability module or controller, which may include instructions such as an algorithm stored on medium and executable by an electronic processor, receives signals from the vehicle, which may include, but not limited to, at least one of yaw rate, vehicle speed, vehicle accelerations, steering wheel angle, handwheel torque, wheel speeds, or tire slips. The Brake-to-Steer Stability module or controller uses these inputs to calculate one or more stability indicators. The Brake-to-Steer Stability module or controller may also receive externally calculated stability indicators, including but not limited to road surface mu or activation flags, from an external system, such as Electronic Stability Control (ESC), Anti-lock Brake System (ABS), Traction Control System (TCS), or Electronic Brake Force Distribution (EBD).

A stability indicator calculated by the Brake-to-Steer Stability module or controller may include yaw rate error. Yaw rate error may be calculated by comparing an estimated or predicted yaw rate with the measured or calculated vehicle yaw rate. Estimated yaw rate may be calculated using at least one of lateral acceleration, vehicle speed, steering wheel angle, handwheel torque, or individual wheel speeds.

A stability indicator calculated by the Brake-to-Steer Stability module or controller may include differential wheel slip. To calculate differential wheel slip, first individual tire longitudinal slips may be calculated. The wheel speed signals and the estimated reference vehicle longitudinal velocity can be used to calculate longitudinal tire slips at each corner of the vehicle. An iteration of this may also use the yaw rate and vehicle track width to better estimate the slip at each corner. Individual tire slips may also be calculated externally and communicated to the Brake-to-Steer Stability module or controller.

From the individual tire longitudinal slips, several types of differential wheel slip may be calculated. For example: the absolute value of the difference between the left and right tire slips for each axle (which is related to the yaw moment applied by longitudinal tire forces on each axle), or the sum of the absolute value of the difference between the left and right tire slips for each axle (which is related to the yaw moment applied by longitudinal tire forces on the whole vehicle), or (for Rear Wheel Drive) the difference between the outside rear and outside front tire slip, or (for Front Wheel Drive) the difference between the outside front and outside rear tire slip.

Each stability indicator may be compared to its stability indicator threshold. A stability indicator threshold may include, but is not limited to, a threshold, tolerance, or expected value. These stability indicators and stability indicator thresholds may be used individually or in combination. When the stability indicators are within their thresholds, at least one of the Brake-to-Steer brake or Brake-to-Steer powertrain commands are allowed to be sent unaltered to the vehicle to aid in lateral control, for normal Brake-to-Steer operation. When the stability indicators are outside their thresholds, the Brake-to-Steer Stability module or controller modulates at least one of the brake or powertrain commands to prevent excessive vehicle instability. This modulation may be achieved through various means, including but not limited to, calculating new commands by multiplying or dividing original commands by a scalar, or calculating new commands by adding or subtracting an offset from the original commands. These scalars or offsets may be predetermined or calculated dynamically, based on the difference between the stability indicators and their thresholds. The Brake-to-Steer Stability module or controller may also output its internal calculations and/or statuses for downstream use. Further details and other variations including methods, systems, computer medium including instructions stored thereon and executable by an electronic processor, and functionalities are described hereafter.

As a non-limiting example, stability indicator-based Brake-to-Steer regulation may include yaw rate error-based Brake-to-Steer regulation to improve Brake-to-Steer performance and vehicle safety. Estimated yaw rate may be calculated using lateral acceleration and vehicle speed. Estimated yaw rate may be calculated using wheel speeds. Estimated yaw rate may be calculated using vehicle speed and steering wheel angle. Estimated yaw rate may be calculated using any combination of the previously defined methods. An estimated yaw rate may be compared to a measured or calculated vehicle yaw rate to calculate yaw rate error. Using this error calculation and depending on the size and direction of the yaw rate error, the system and method may adjust, modify, update, regulate, or create at least one new brake or powertrain command to prevent further vehicle oversteer. When the yaw rate error stability indicator is within an acceptable threshold range, at least one of the Brake-to-Steer brake or Brake-to-Steer powertrain commands are allowed to be sent without a stability modification to the vehicle to aid in lateral control for normal Brake-to-Steer operation.

As a non-limiting example, stability indicator-based Brake-to-Steer regulation may include wheel speed-based Brake-to-Steer regulation to improve Brake-to-Steer performance and vehicle safety. The system, method or product may use measured wheel speed signals and the vehicle longitudinal velocity to calculate longitudinal tire slips of each corner of the car. From the slip ratios, several stability indicators can be calculated. For example, the absolute value of the difference between left and right tire slips for each axle, or the sum of the absolute value of the difference between the left and right tire slips for each axle, or in the case of rear wheel drive vehicles, the difference between the outside rear and outside front tire slip, or in the case of front wheel drive vehicles, the difference between the outside front and outside rear tire slip. These slip ratio based stability indicators may be used individually or in combination. According to the disclosed system and method for stability indicator-based Brake-to-Steer regulation, at least one of the Brake-to-Steer brake or Brake-to-Steer powertrain commands may be modulated to prevent excessive vehicle instability when these stability indicators are outside their acceptable threshold range. When the slip ratio-based stability indicators are within an acceptable threshold range, at least one of the Brake-to-Steer brake or Brake-to-Steer powertrain commands are allowed to be sent to the vehicle without alteration to aid in lateral control.

In the case of steer-by-wire vehicles, it is assumed that steering-wheel-based steering angle sensor (SAS) or some other form of SAS is able to interpret driver intentions. This steering angle can be used to predict intended vehicle yaw rate. Yaw rate error will be calculated by comparing the predicted, intended vehicle yaw rate and measured vehicle yaw rate. Similar stability mitigation strategies can be implemented in a steer-by-wire system to those described in the paragraphs above. The alteration of at least one Brake-to-Steer brake or Brake-to-Steer powertrain command may be different for a steer-by-wire vehicle use case.

FIG. 1 depicts an illustrative variation of block diagram of a system and method for stability indicator-based Brake-to-Steer lateral stability management 100. FIG. 1 depicts only a demonstrative way in which the method and system may be accomplished. The system and method may include receiving vehicle data such as vehicle speed 104, lateral acceleration 106, and vehicle yaw rate 108 from onboard vehicle systems and sensors. Stability indicator-based command scaling algorithm 110 may include estimating yaw rate 118 based on vehicle speed 104 and lateral acceleration 106. Yaw rate error 120 may be calculated based on the estimated yaw rate 118 and measured vehicle yaw rate 108. Calculated yaw rate error 120 may be used in a yaw rate error-based scalar calculation 122 based on measured vehicle speed 104. The yaw rate error-based scalar calculation 122 may communicate a scalar value 124 to at least one brake or powertrain command modifier 114. Alternatively, yaw rate error-based scalar calculation 122 may communicate a reduction value to at least one of the Brake-to-Steer brake or Brake-to-Steer powertrain command modifier 114. The system and method may include communicating at least one of the Brake-to-Steer brake or Brake-to-Steer powertrain commands 102 in a pre-scaled state 112 to at least one of the Brake-to-Steer brake or powertrain command modification 114. At least one of the Brake-to-Steer brake or Brake-to-Steer powertrain command modifier 114 may determine at least one of the modified Brake-to-Steer brake or Brake-to-Steer powertrain commands 126 based on at least one of the pre-scaled brake or powertrain commands 102, 112 and the yaw rate error-based scalar calculation 122 and the scalar value or reduction value 124. At least one of the modified Brake-to-Steer brake or Brake-to-Steer powertrain commands 126 may be communicated to a domain controller (not shown) to send at least one of the modified brake or powertrain commands to at least one brake or powertrain actuator to reduce lateral instability in a vehicle during Brake-to-Steer. In a number of variations, a modifier value may be based on, but not limited to, at least one of: a two-dimensional yaw rate error versus speed table; a one-dimensional yaw rate error table; a single yaw rate error value; a two-dimensional yaw rate error verses wheel speed table; a two-dimensional yaw rate error verses yaw rate table; a three-dimensional table of yaw rate error, yaw rate, wheel speeds; or other numeric calculations.

Figure 2:
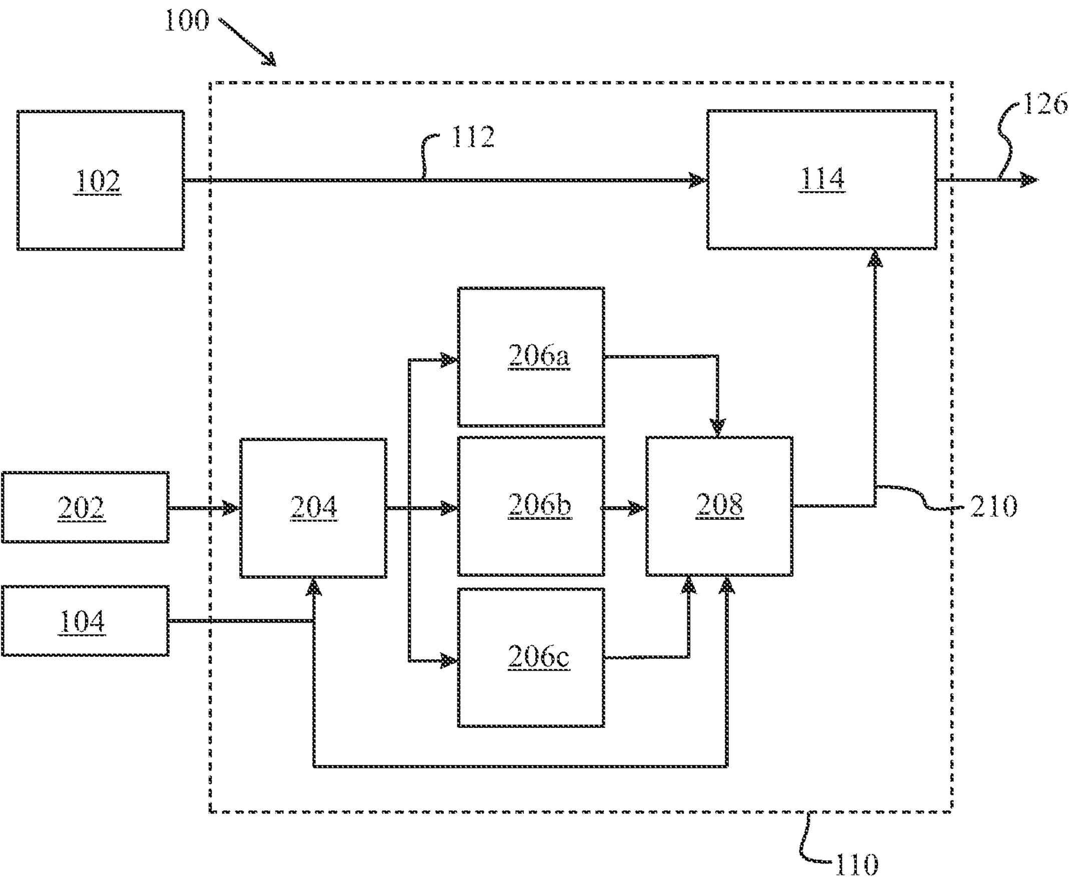
FIG. 2 depicts an illustrative variation of a block diagram of a system and method of Brake-to-Steer lateral stability management.

FIG. 2 depicts an illustrative variation of block diagram of a system and method for stability indicator-based Brake-to-Steer lateral stability management 100. The system may use measured wheel speed signals 202 and vehicle speed 104 to calculate longitudinal tire slip ratios 204 of each corner of the car. Based on longitudinal tire slip ratios 204, stability indicators 206*a*, 206*b*, or 206*c* may be calculated which serve as an indication of vehicle stability. The stability indicator-based scalar calculation 208 may receive stability indicators 206*a*, 206*b*, and 206*c*, and may use them individually or in combination to calculate a wheel speed-based scalar 210. The system and method may include communicating at least one of the Brake-to-Steer brake or Brake-to-Steer powertrain commands 102 in a pre-scaled state 112 to at least one of the brake or powertrain command modifier 114. At least one of the Brake-to-Steer brake or Brake-to-Steer powertrain command modifier 114 may receive a wheel speed-based scalar 210 based on stability indicators 206*a*, 206*b*, or 206*c* and the stability indicator-based scalar calculation 208, determined via a stability indicator command scaling algorithm 110. The Brake-to-Steer brake or Brake-to-Steer powertrain command modifier 114 may determine at least one of the modified Brake-to-Steer brake or Brake-to-Steer powertrain commands 126 based on at least one of the pre-scaled brake or powertrain commands 102, 112 and scalar calculation 208 and the scalar value or reduction value 210. It should be noted that FIG. 2 depicts only a demonstrative example of a stability indicator command scaling algorithm 110 utilizing measured wheel speed signals 202, calculated longitudinal tire slip ratios 204 of each corner of the car and stability indicators 206*a*, 206*b*, or 206*c*. At least one of the modified Brake-to-Steer brake or Brake-to-Steer powertrain commands 126 may be communicated to a domain controller (not shown) to send at least one of the modified brake or powertrain commands to at least one brake or powertrain actuator to reduce lateral instability in a vehicle during Brake-to-Steer.

Figure 3:
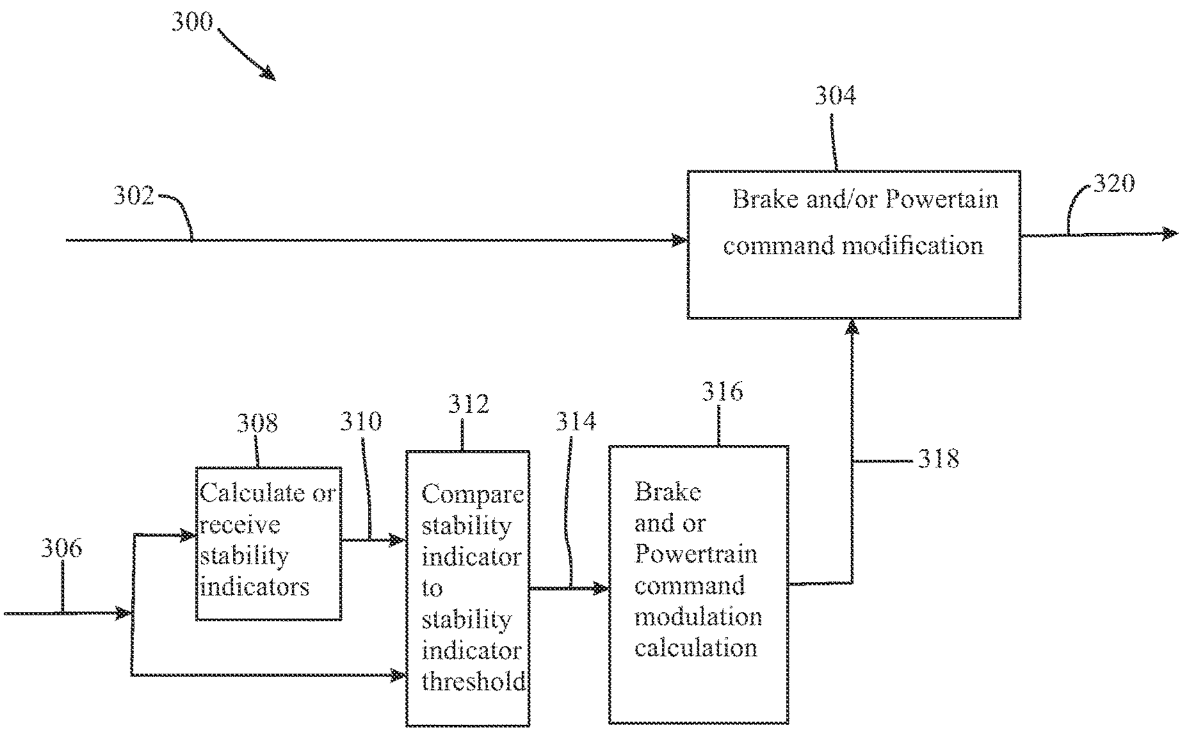
FIG. 3 depicts an illustrative variation of a block diagram of a system and method of Brake-to-Steer lateral stability management.

FIG. 3 illustrates a method and system 300 which may include original Brake-to-Steer commands 302 being received by decision module 304 which outputs 320 the original Brake-to-Steer commands or modified Brake-to-Steer commands to at least one brake or powertrain system. A variety of vehicle signals 306 may be received by module 308 which may calculate or receive stability indicators and output 310 the same, and the vehicle signals also may be received by module 312, which compares at least one stability indicator to a stability indicator threshold. Module 312 may receive stability indictors that were calculated or received by module 308. Module 312 may compare the stability indictor to a stability indictor threshold and if the stability indicator is beyond the limit of the stability indicator threshold range then module 312 may output 314 data regarding the stability indicator and the stability indicator threshold, which may be received by module 316. Module 316 may calculate at least one brake or powertrain command modulation and may output 318 the calculated modulation to module 304. Module 304 may receive the calculated modulation and modifies at least one received brake or powertrain command by the calculated modulations to provide at least one modified brake or powertrain command and outputs 320 at least one modified brake or powertrain command to at least one brake or powertrain system.

A number of variations may include a computer readable medium, which may be non-transitory, having written instructions stored thereon and executable by an electronic processor to provide functionality including calculating or receiving a vehicle stability indicator, comparing the stability indicator to a stability indicator threshold, and if the stability indicator is beyond/outside of the limit of the stability indicator threshold range then calculating a modulation of at least one Brake-to-Steer brake or Brake-to-Steer powertrain command to provide at least one modified brake or powertrain command and outputting at least one modified brake or powertrain command. At least one of the modified brake or powertrain commands may be received by at least one brake or powertrain system.

Figure 4:
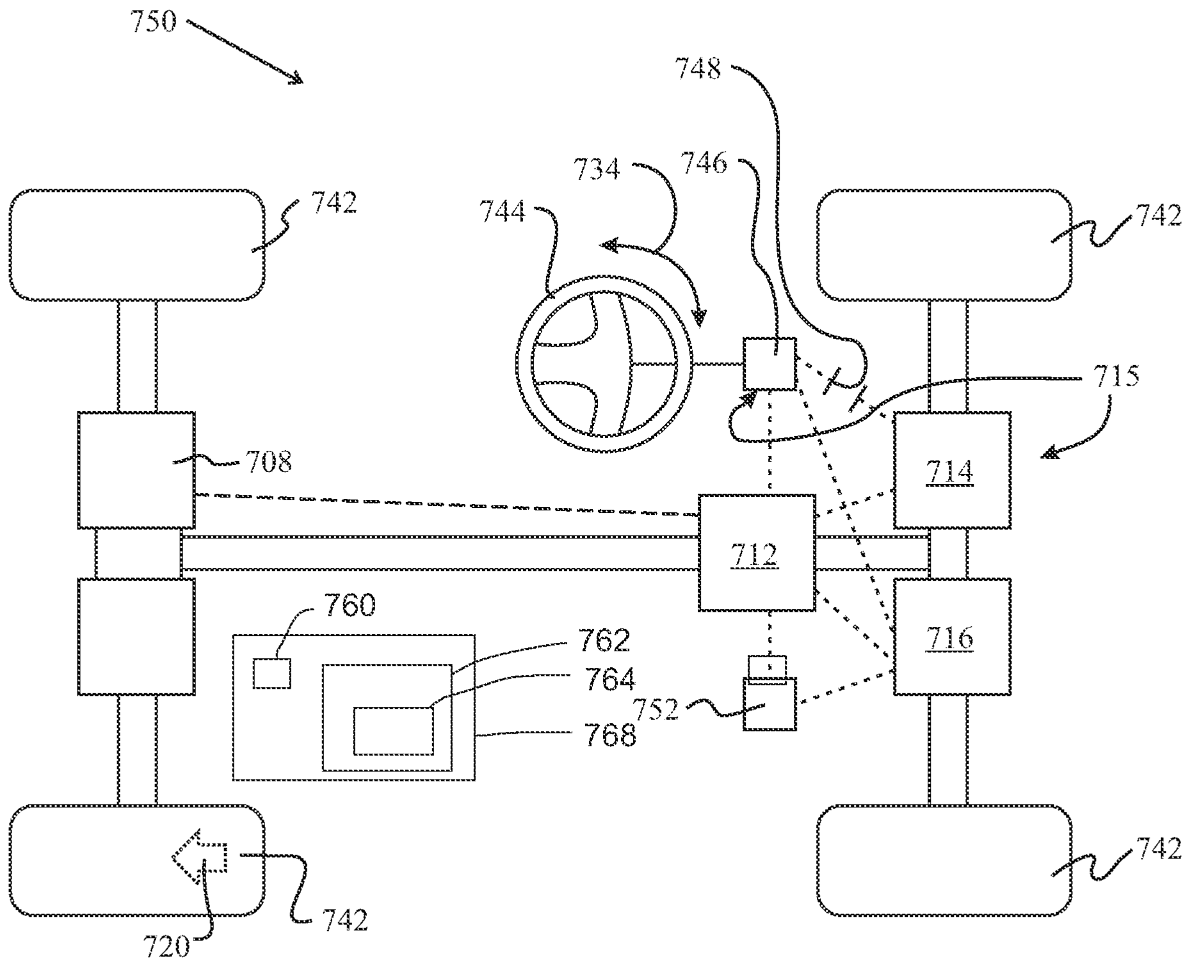
FIG. 4 depicts an illustrative variation of a block diagram of a vehicle with a steer-by-wire system, wherein the vehicle also has the capability to perform Brake-to-Steer, and wherein the Brake-to-Steer function also contains methods of lateral stability management.
Figure 5:
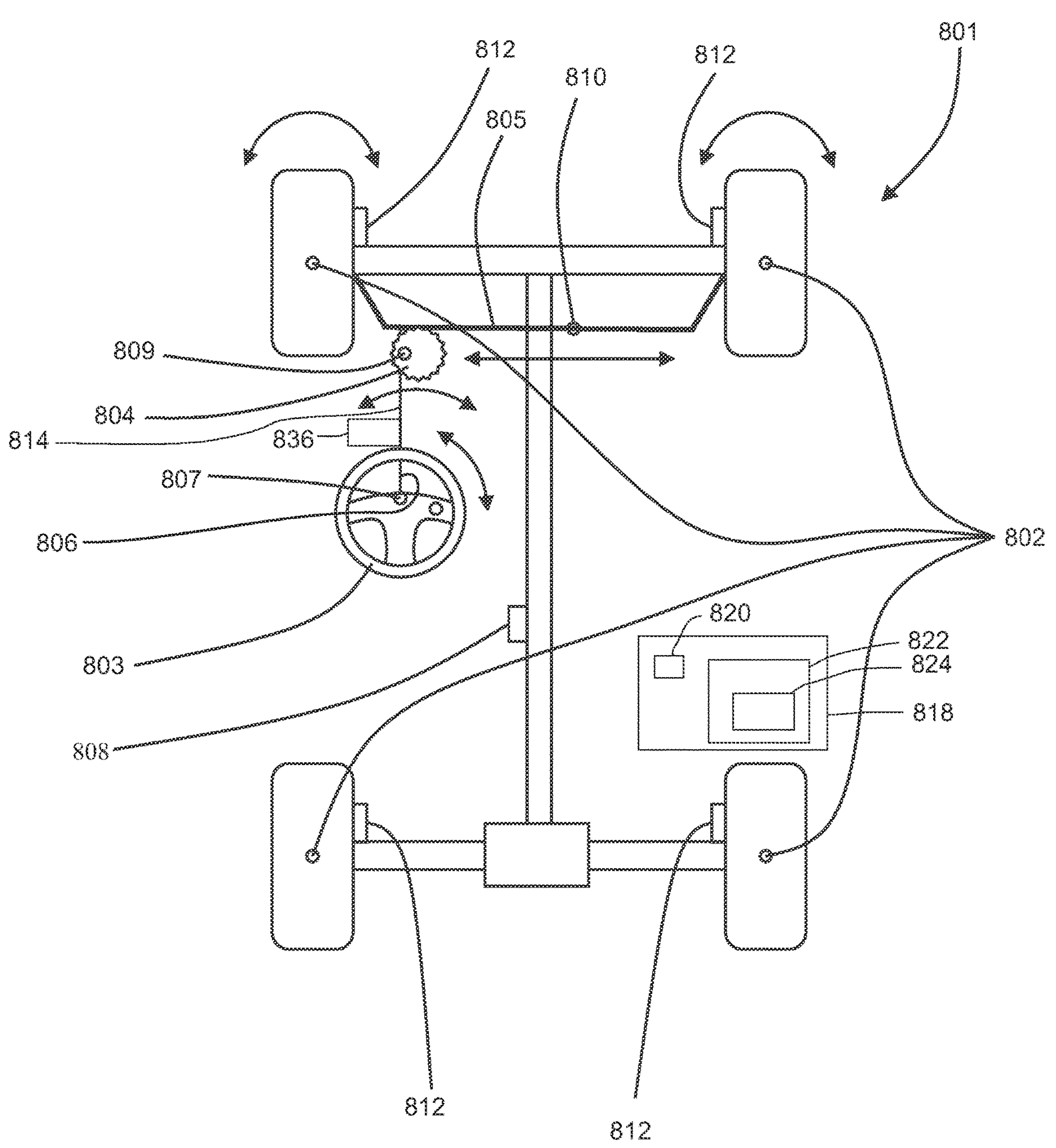
FIG. 5 depicts an illustrative variation of a block diagram of a vehicle with a connected power steering system, wherein the vehicle also has the capability to perform Brake-to-Steer, and wherein the Brake-to-Steer function also contains methods of lateral stability management.

FIG. 4 illustrates a vehicle having steer-by-wire functionality and a system for carrying out method described herein. FIG. 5 illustrates a vehicle with a mechanical steering linkage and a system for carrying out method described herein. The components and systems of FIGS. 4 and 5 may be interchanged provided that the vehicle in FIG. 4 retains steer-by-wire functionality and the vehicle in FIG. 5 retains a mechanical steering linkage.

FIG. 4 depicts an illustrative variation of various portions of a vehicle equipped with hardware sufficient for carrying out at least some of the systems and methods described herein. All sensors depicted in the illustrative variation are illustrative, so the sensed inputs may come from various other vehicle locations or vehicle sensors given they provide a similar sensing function. A vehicle 750 may include a controller 712 constructed and arranged to provide Brake-to-Steer functionality in the vehicle 750. The controller 712 may be in operable communication with a steer-by-wire system 715, and an electronic braking system 716. The steer-by-wire system 715 may be composed of handwheel actuator 746 and roadwheel actuator 714. The steer-by-wire system 715 may be constructed and arranged to turn at least one road wheel 742. The electronic braking system 716 may apply brake force or brake torque 720 to determined appropriate roadwheels 742. A driver may utilize a handwheel 744 including at least one handwheel actuator 746 to provide driver input 734 for lateral movement and send steering commands to the steer-by-wire system 715 and roadwheel actuator 714. The electronic braking system 716 may be in operable communication with the controller 712 and a driver braking input system 752, such as a brake pedal system, to receive driver braking input. According to some variations, the handwheel actuator 746 may be in operable communication with the controller 712, the steer-by-wire roadwheel actuator 714, or the electronic braking system 716. In some variations, the handwheel actuator 746 may be disconnected from or in a failure state 748 or unable to communicate with the steer-by-wire roadwheel actuator 714. In such a variation, the handwheel actuator 746 may communicate steering commands to the controller 712, which may receive steer-by-wire system 715 health status information. Where the controller 712 has received steer-by-wire system 715 information indicative of steer-by-wire system 715 failure 748 or roadwheel actuator 714 failure, the controller 712 may convert steering commands from the handwheel actuator 746 to brake force or brake torque commands to be communicated to the electronic braking system 716. The electronic braking system 716 may apply brake force or brake torque 720 to determined appropriate roadwheels 742 to effectuate lateral movement of the vehicle as input 734 by the driver via the handwheel 744. Controller 712 may also send powertrain commands to a powertrain system 708. Controller 712 and any other controller, for example controller 768, may be provided to carry out one or more functions described herein and may include a processor 760, memory 762, wherein the instructions 764 stored in the memory 762 are executable by the processor 760.

Referring now to FIG. 5, an illustrative variation of a vehicle equipped with hardware that allows it to carry out at least some of the methods disclosed herein is shown. All sensors depicted in the illustrative variation are illustrative, so the sensed inputs may come from various other vehicle locations or vehicle sensors given they provide a similar sensing function. A vehicle 801 may be equipped with roadwheels 802 and a handwheel 803 for turning the roadwheels 802 via a pinion 804 that engages a rack 805 that is constructed and arranged to turn the roadwheels 802. In the illustrative variation shown, the handwheel 803 may be equipped with a hand wheel torque sensor 806 and a hand wheel angle sensor 807 so that any turning of the handwheel may produce sensor data that may be communicated to or accessed by a controller 808. Controller 808 may provide all other functionality described herein including Brake-to-Steer, Brake-to-Steer Stability, steer-by-wire control, powertrain control, braking control, control a vehicle system, or one or more other controllers may be provided to do the same. Although, in this illustrative variation, the controller 808 is shown onboard the vehicle, the controller may also be located somewhere apart from the vehicle and communicated with wirelessly by the sensors or the vehicle.

Pinion 804 may be equipped with a pinion torque sensor 809 so that any turning of the pinion may be observed by or communicated to the controller 808 and utilized by the methods described herein. In the illustrative variation shown, rack 805 may be equipped with a rack force sensor 810 so that any rack forces detected during driving may be observed by or communicated to the controller 808 and utilized by the methods described herein. The vehicle may have a steering shaft 814 connecting the steering wheel or steering interface 803 to a pinion 804. An electric power steering assist or hydraulic power steering device 836 may be connected to the shaft 814 to assist the driver in steering the roadwheels of the vehicle by reducing the force or torque the driver would need to apply to the steering wheel or steering interface 803 if the power steering device 836 was not present. Also shown in this illustrative variation, the roadwheels 802 may be equipped with roadwheel sensors so that any roadwheel data detected during driving may be observed by or communicated to the controller 808 and utilized by the methods described herein. Additionally, in the illustrative variation shown, brakes 812 are located near roadwheels 802. Controller 808 and any other controller, for example controller 818, may be provided to carry out one or more functions described herein and may include a processor 820, memory 822, wherein the instructions 824 stored in the memory 822 are executable by the processor 820 to determine if the hand wheel angle sensor 807 or if the pinion 804, rack 805, pinion sensor 809, or rack sensor 810 have failed. Furthermore, wherein the instructions 824 stored in memory 822 are executable by the processor 820 to carry out any of the methods or achieve any functionality described herein.

Modules and controllers described herein may include software, hardware, or a computing device including non-transitory computer readable medium, such as but not limited to memory, having instructions stored there on, and a processor for executing the instructions to perform the acts, steps, methods and functionality described herein. Multiple modules and controllers and their associated acts, steps, methods and functionality may be contained in or achieved by one or more computing devices.

The following description of variants is only illustrative of components, elements, acts, products, and methods considered to be within the scope of the invention and are not in any way intended to limit such scope by what is specifically disclosed or not expressly set forth. The components, elements, acts, products, and methods as described herein may be combined and rearranged other than as expressly described herein and still are considered to be within the scope of the invention.

Variation 1 may include a computer readable medium comprising: non-transitory memory having instructions stored thereon executable by an electronic processor, the instructions when executed by the electronic processor implement the following functions comprising: receiving or calculating at least one stability indicator wherein the received at least one stability indicator comprises at least one of vehicle speed, lateral acceleration, vehicle yaw rate, steering wheel angle, steering wheel torque, speed, wheel speed or yaw rate, and wherein the calculating at least one stability indicator comprises calculating a yaw rate; calculating an estimated yaw rate based on at least one of vehicle speed, wheel speed or lateral acceleration; calculating a yaw rate error based on at least one of the estimated yaw rate or measured vehicle yaw rate; determining a brake command modifier value based on at least one of measured vehicle speed or the yaw rate error; modifying at least one brake command based on the brake command modifier value to provide a modified brake command; communicating the modified brake command to a brake-to-steer system.

Variation 2 may include a computer readable medium as in Variation 1, further comprising determining a modified powertrain modifier value based on at least one of measured vehicle speed or the yaw rate error; and modifying at least one powertrain command based on the powertrain command modifier value.

Variation 3 may include a computer readable medium as in Variation 1, wherein the brake command modifier value is a scalar value.

Variation 4 may include a computer readable medium as in Variation 2, wherein the powertrain command modifier value is a scalar value.

Variation 5 may include a computer readable medium as in Variation 1, wherein the brake command modifier value is a reduction value.

Variation 6 may include a computer readable medium as in Variation 2, wherein the powertrain command modifier value is a reduction value.

Variation 7 may include a computer readable medium as in Variation 1, wherein determining a brake command modifier value based on at least one of measured vehicle speed or the yaw rate error comprises utilizing at least one of: a two-dimensional yaw rate error versus speed table; a one-dimensional yaw rate error table; a single yaw rate error value; a two-dimensional yaw rate error verses wheel speed table; a two-dimensional yaw rate error verses yaw rate table; a three-dimensional table of yaw rate error, yaw rate, wheel speeds; or other numeric calculations.

Variation 8 may include a computer readable medium as in Variation 1, further comprising communicating Brake-to-Steer commands in a pre-scaled state to a Brake-to-Steer command modifier prior to modifying at least one brake command based on the brake command modifier value.

Variation 9 may include a computer program product comprising instructions executable by an electronic processor to carry out actions, comprising: determining that a steering maneuver is underway in a vehicle; receiving vehicle data comprising at least one of vehicle feedback information or actuator feedback information; calculating a stability indicator threshold; calculating a stability indicator; determining a difference between the stability indicator and the stability indicator threshold; comparing the stability indicator threshold and the stability indicator; and based on the comparison generating at least one alteration to a Brake-to-Steer actuator command.

Variation 10 may include a computer readable medium as in Variation 9, further comprising determining a modified Brake-to-Steer command modifier value based on the comparison, and wherein the generating at least one alteration to a Brake-to-Steer actuator command is based on the Brake-to-Steer command modifier value.

Variation 11 may include a computer readable medium as in Variation 9 further comprising based on the comparison generating at least one alteration to a powertrain command.

Variation 12 may include a computer readable medium as in Variation 11, further comprising determining a modified powertrain modifier value based on the comparison, and wherein the generating at least one alteration to a powertrain command is based on powertrain command modifier value.

Variation 13 may include a computer readable medium as in Variation 10, wherein the brake command modifier value is a scalar value.

Variation 14 may include a computer readable medium as in Variation 12, wherein the powertrain command modifier value is a scalar value.

Variation 15 may include a computer readable medium as in Variation 10, wherein the brake command modifier value is a reduction value.

Variation 16 may include a computer readable medium as in Variation 12, wherein the powertrain command modifier value is a reduction value.

Variation 17 may include a computer readable medium as in Variation 10, wherein determining a brake command modifier value based on the comparison comprises utilizing at least one of: a two-dimensional yaw rate error versus speed table; a one-dimensional yaw rate error table; a single yaw rate error value; a two-dimensional yaw rate error verses wheel speed table; a two-dimensional yaw rate error verses yaw rate table; a three-dimensional table of yaw rate error, yaw rate, wheel speeds; or other numeric calculations.

Variation 18 may include a computer readable medium as in Variation 9, further comprising communicating Brake-to-Steer commands in a pre-scaled state to a Brake-to-Steer command modifier prior to modifying at least one brake command based on the brake command modifier value.

Variation 19 may include a computer readable medium, which may be non-transitory, having written instructions stored thereon and executable by an electronic processor to provide functionality comprising: determining if a brake-to-steer system is steering the vehicle, and if so calculating or receiving a vehicle stability indicator, comparing the stability indicator to a stability indicator threshold, and if the stability indicator is beyond the limit of the stability indicator threshold range then calculating a modulation of at least one of a brake or powertrain command to provide a modified brake-to-steer brake command or brake-to-steer powertrain command, and outputting the modified brake-to-steer brake command or brake-to-steer powertrain command.

Variation 20 may include a computer readable medium as in Variation 19, wherein calculating a modulation of at least one of a brake or powertrain command is based on at least one of measured vehicle speed or the yaw rate error; and modified brake or powertrain command is based on a brake command modifier value or powertrain command modifier value.

Variation 21 may include a computer readable medium as in Variation 20, wherein the brake command modifier value is a scalar value.

Variation 22 may include a computer readable medium as in Variation 20, wherein the powertrain command modifier value is a scalar value.

Variation 23 may include a computer readable medium as in Variation 20, wherein the brake command modifier value is a reduction value.

Variation 24 may include a computer readable medium as in Variation 20, wherein the powertrain command modifier value is a reduction value.

Variation 25 may include a computer readable medium as in Variation 20, wherein the brake command modifier value based on at least one of measured vehicle speed or the yaw rate error comprises utilizing at least one of: a two-dimensional yaw rate error versus speed table; a one-dimensional yaw rate error table; a single yaw rate error value; a two-dimensional yaw rate error verses wheel speed table; a two-dimensional yaw rate error verses yaw rate table; a three-dimensional table of yaw rate error, yaw rate, wheel speeds; or other numeric calculations.

Variation 26 may include a computer readable medium as in Variation 20, further comprising communicating Brake-to-Steer commands in a pre-scaled state to a Brake-to-Steer command modifier prior to providing a modified brake command based on the brake command modifier value.

Variation 27 may include a method comprising: receiving or calculating at least one stability indicator wherein the received at least one stability indicator comprises at least one of vehicle speed, lateral acceleration, vehicle yaw rate, steering wheel angle, steering wheel torque, speed, wheel speed or yaw rate, and wherein the calculating at least one stability indicator calculating a yaw rate; calculating an estimated yaw rate based on at least one of vehicle speed, wheel speed or lateral acceleration; calculating a yaw rate error based on at least one of the estimated yaw rate or measured vehicle yaw rate; determining a brake command modifier value based on at least one of measured vehicle speed or the yaw rate error; modifying at least one brake command based on the brake command modifier value to provide a modified brake command; communicating the modified brake command to a brake-to-steer system.

Variation 28 may include a method as in Variation 27, further comprising determining a modified powertrain modifier value based on at least one of measured vehicle speed or the yaw rate error; and modifying at least one powertrain command based on the powertrain command modifier value.

Variation 29 may include a method as in Variation 27, wherein the brake command modifier value is a scalar value.

Variation 30 may include a method as set in Variation 28, wherein the powertrain command modifier value is a scalar value.

Variation 31 may include a method as set in Variation 27, wherein the brake command modifier value is a reduction value.

Variation 32 may include a method as set in Variation 28, wherein the powertrain command modifier value is a reduction value.

Variation 33 may include a method as set in Variation 27, wherein determining a brake command modifier value based on at least one of measured vehicle speed or the yaw rate error comprises utilizing at least one of: a two-dimensional yaw rate error versus speed table; a one-dimensional yaw rate error table; a single yaw rate error value; a two-dimensional yaw rate error verses wheel speed table; a two-dimensional yaw rate error verses yaw rate table; a three-dimensional table of yaw rate error, yaw rate, wheel speeds; or other numeric calculations.

Variation 34 may include a method as set in Variation 27, further comprising communicating Brake-to-Steer commands in a pre-scaled state to a Brake-to-Steer command modifier prior to modifying at least one brake command based on the brake command modifier value.

Variation 35 may include a method comprising: determining if a brake-to-steer system is steering a vehicle, and if so calculating or receiving a vehicle stability indicator, comparing the stability indicator to a stability indicator threshold, and if the stability indicator is beyond the limit of the stability indicator threshold range then calculating a modulation of at least one of a brake or powertrain commands to provide at least one of a modified brake-to-steer brake command or brake-to-steer powertrain command, and outputting at least one of the modified brake-to-steer brake command or brake-to-steer powertrain command.

Variation 36 may include a method as set in Variation 35 further comprising receiving the output modified brake command by a brake system or the output modified powertrain command by a powertrain system.

Variation 37 may include a method as set in Variation 35, wherein calculating a modulation of at least one of a brake or powertrain command is based on at least one of measured vehicle speed or the yaw rate error; and the modified brake or powertrain command is based on a brake command modifier value or powertrain command modifier value.

Variation 38 may include a method as set in Variation 37, wherein the brake command modifier value is a scalar value.

Variation 39 may include a method as set in Variation 37, wherein the powertrain command modifier value is a scalar value.

Variation 40 may include a method as set in Variation 37, wherein the brake command modifier value is a reduction value.

Variation 41 may include a method as set in Variation 37, wherein the powertrain command modifier value is a reduction value.

Variation 42 may include a method as set in Variation 37, wherein the brake command modifier value based on at least one of measured vehicle speed or the yaw rate error comprises utilizing at least one of: a two-dimensional yaw rate error versus speed table; a one-dimensional yaw rate error table; a single yaw rate error value; a two-dimensional yaw rate error verses wheel speed table; a two-dimensional yaw rate error verses yaw rate table; a three-dimensional table of yaw rate error, yaw rate, wheel speeds; or other numeric calculations.

Variation 43 may include a method as set in Variation 37, further comprising communicating Brake-to-Steer commands in a pre-scaled state to a Brake-to-Steer command modifier prior to providing a modified brake command based on the brake command modifier value.

Variation 44 may include a method as set in Variation 35 wherein the calculated modulation is a scalar value.

Variation 45 may include a method comprising reducing the potential for loss of vehicle control by modifying at least one of a brake-to-steer brake command or brake-to-steer powertrain command based on a number of calculated, measured, or observed stability indicators.

Variation 46 may include a method as set in Variation 45 further comprising comparing the stability indicator to a stability indicator threshold, and if the stability indicator is beyond the limit of the stability indicator threshold range then calculating a modulation of at least one of a brake or powertrain commands to provide at least one of a modified brake-to-steer brake command or powertrain command, and outputting at least one of the modified brake-to-steer brake command or brake-to-steer powertrain command.

Variation 47 may include a method as set in Variation 46 further comprising receiving the output modified brake command by a brake system or the output modified powertrain command by a powertrain system.

Variation 48 may include a method as set in Variation 46, wherein calculating a modulation of at least one of a brake or powertrain command is based on at least one of measured vehicle speed or the yaw rate error; and the modified brake or powertrain command is based on a brake command modifier value or powertrain command modifier value.

Variation 49 may include a method as set in Variation 48, wherein the brake command modifier value is a scalar value.

Variation 50 may include a method as set in Variation 48, wherein the powertrain command modifier value is a scalar value.

Variation 51 may include a method as set in Variation 48, wherein the brake command modifier value is a reduction value.

Variation 52 may include a method as set in Variation 48, wherein the powertrain command modifier value is a reduction value.

Variation 53 may include a method as set in Variation 48, wherein the brake command modifier value based on at least one of measured vehicle speed or the yaw rate error comprises utilizing at least one of: a two-dimensional yaw rate error versus speed table; a one-dimensional yaw rate error table; a single yaw rate error value; a two-dimensional yaw rate error verses wheel speed table; a two-dimensional yaw rate error verses yaw rate table; a three-dimensional table of yaw rate error, yaw rate, wheel speeds; or other numeric calculations.

Variation 54 may include a method as set in Variation 48, further comprising communicating Brake-to-Steer commands in a pre-scaled state to a Brake-to-Steer command modifier prior to providing a modified brake command based on the brake command modifier value.

Variation 55 may include a method as set in Variation 46 wherein the calculated modulation is a scalar value.

Variation 56 may include a non-transitory computer readable medium having written instructions stored thereon and executable by an electronic processor to provide functionality comprising: receiving wheel speeds and vehicle speed data and calculating stability indicators using the wheel speed and speed data; calculating a stability indicator-based scalar using at least one of the stability indicators; communicating at least one of a brake-to-steer brake command or a powertrain command in a pre-scaled state to at least one of a brake or a powertrain command modifier; communicating the stability indicator-based scalar to the at least one of a brake-to-steer brake or a brake-to-steer powertrain command modifier and producing at least one of a modified brake-to-steer brake command or a modified brake-to-steer powertrain command.

Variation 57 may include a non-transitory computer readable medium in Variation 56 further comprising calculating tire slip ratios for each tire at the corners of a vehicle using the wheel speeds and vehicle speed data; and wherein the calculating stability indicators comprises using the wheel slip ratios.

Variation 58 may include a non-transitory computer readable medium in Variation 56 wherein the functionality further comprises communicating at least one of the brake-to-steer brake command or a powertrain command in a pre-scaled state or communication at least one of a modified brake-to-steer brake command or modified powertrain command to a domain controller to reduce lateral instability in a vehicle during brake-to-steer operation.

Variation 59 may include a non-transitory computer readable medium in Variation 56, wherein the brake command modifier value is a scalar value.

Variation 60 may include a non-transitory computer readable medium in Variation 56, wherein the command modifier produces a powertrain command modifier value that is a scalar value.

Variation 61 may include a non-transitory computer readable medium in Variation 56, wherein the command modifier produces a brake command modifier value that is a reduction value.

Variation 62 may include a non-transitory computer readable medium in Variation 56, wherein the command modifier produces a powertrain command modifier value that is a reduction value.

The above description of select variations within the scope of the invention is merely illustrative in nature and, thus, variations or variants thereof are not to be regarded as a departure from the spirit and scope of the invention.

What is claimed is:

1. A non-transitory computer readable medium having written instructions stored thereon and executable by an electronic processor to provide functionality comprising:

receiving wheel speeds and vehicle speed data and calculating stability indicators using the wheel speeds and vehicle speed data;

determining when a brake-to-steer system is steering a vehicle;

calculating a stability indicator-based scalar using the stability indicators;

communicating at least one of original brake-to-steer brake command or original powertrain command to at least one of a brake-to-steer brake command modifier or a brake-to-steer powertrain command modifier;

communicating the stability indicator-based scalar to the at least one of the brake-to-steer brake command modifier or the brake-to-steer powertrain command modifier and modifying the original brake-to-steer brake command or the original powertrain command, by the brake-to-steer brake command modifier or the brake-to-steer powertrain command modifier, to produce at least one of a modified brake-to-steer brake command or a modified brake-to-steer powertrain command.

2. A non-transitory computer readable medium as set forth in claim 1 further comprising calculating tire slip ratios for each tire at corners of the vehicle using the wheel speeds and vehicle speed data;

and wherein the calculating stability indicators comprises using the tire slip ratios.

3. A non-transitory computer readable medium as set for in claim 1 wherein the functionality further comprises communicating at least one of the original brake-to-steer brake command or the original powertrain command or communication at least one of a modified brake-to-steer brake command or modified powertrain command to a domain controller to reduce lateral instability in a vehicle during brake-to-steer operation.

4. A non-transitory computer readable medium as in claim 1, wherein the brake-to-steer brake command modifier produces a brake-to-steer brake command value that is a scalar value.

5. A non-transitory computer readable medium as in claim 1, wherein the brake-to-steer powertrain command modifier produces a powertrain command modifier value that is a scalar value.

6. A non-transitory computer readable medium as in claim 1, wherein the brake-to-steer brake command modifier produces a brake command modifier value that is a reduction value.

7. A non-transitory computer readable medium as in claim 1, wherein the brake-to-steer powertrain command modifier produces a powertrain command modifier value that is a reduction value.

8. A non-transitory computer readable medium having written instructions stored thereon and executable by an electronic processor to provide functionality comprising:

receiving wheel speeds and vehicle speed data and calculating stability indicators using the wheel speeds and the vehicle speed data;

determining when a brake-to-steer system is steering a vehicle;

calculating a stability indicator-based scalar using the stability indicators;

communicating at least one of an original brake-to-steer brake command or an original powertrain command in a first state to at least one of a brake command modifier or a powertrain command modifier;

communicating the stability indicator-based scalar to the at least one of the brake-to-steer brake command modifier or the brake-to-steer powertrain command modifier and modifying the original brake-to-steer brake command or the original powertrain command, by the brake-to-steer brake command modifier or the brake-to-steer powertrain command modifier, to produce at least one of a modified brake-to-steer brake command or a modified brake-to-steer powertrain command.

9. A non-transitory computer readable medium as set for in claim 8 wherein the brake-to-steer brake command modifier produces a brake command modifier value that is a scalar value.

10. A non-transitory computer readable medium having written instructions stored thereon and executable by an electronic processor to provide functionality comprising:

determining when a brake-to-steer system is steering the vehicle;

communicating at least one of an original brake-to-steer brake command or an original brake-to-steer powertrain command;

calculating or receiving a vehicle stability indicator;

comparing the stability indicator to a stability indicator threshold range, and when the stability indicator is beyond a limit of the stability indicator threshold range then calculating a modulation of at least one of the original brake-to-steer brake command or an original brake-to-steer powertrain command and applying the modulation to the original brake-to-steer brake command or the original brake-two-steer powertrain command to provide a modified brake-to-steer brake command or a modified brake-to-steer powertrain command, and outputting the modified brake-to-steer brake command or the modified brake-to-steer powertrain command.

11. A non-transitory computer readable medium as in claim 10, wherein calculating a modulation of at least one of the original brake-to-steer brake command or the original brake-to-steer powertrain command is based on at least one of measured vehicle speed or yaw rate error; and wherein the modified brake-to-steer brake command or a modified brake-to-steer powertrain command is based on a brake command modifier value or a powertrain command modifier value.

12. A non-transitory computer readable medium as in claim 11, wherein the brake command modifier value is a scalar value.

13. A non-transitory computer readable medium as in claim 11, wherein the powertrain command modifier value is a scalar value.

14. A non-transitory computer readable medium as in claim 11, wherein the brake command modifier value is a reduction value.

15. A non-transitory computer readable medium as in claim 11, wherein the powertrain command modifier value is a reduction value.

16. A non-transitory computer readable medium as in claim 11, wherein the brake command modifier value based on at least one of measured vehicle speed or the yaw rate error comprises utilizing at least one of: a two-dimensional yaw rate error versus speed table; a one-dimensional yaw rate error table; a single yaw rate error value; a two-dimensional yaw rate error verses wheel speed table; a two-dimensional yaw rate error verses yaw rate table; a three-dimensional table of yaw rate error, yaw rate, wheel speeds; or other numeric calculations.

17. A non-transitory computer readable medium as in claim 11, wherein the calculating the modulation of at least one of the original brake-to-steer brake command or the original brake-to-steer powertrain command comprises multiplying or dividing the original brake-to-steer brake command or the original brake-to-steer powertrain command by a scalar, or calculating new a command by adding or subtracting an offset from the original brake-to-steer brake command or the original brake-to-steer powertrain command.

* * * * *